No. 689,636. Patented Dec. 24, 1901.
C. W. CARRAWAY.
PLOW.
(Application filed Sept. 30, 1901.)

(No Model.)

Witnesses
Om Simpson
JW Garner

C. W. Carraway
Inventor by C. A. Snow & Co.
Attorneys

THE NORRIS PETERS CO., PHOTO-LITHO., WASHINGTON, D. C.

UNITED STATES PATENT OFFICE.

CHARLES W. CARRAWAY, OF MARCO, FLORIDA.

PLOW.

SPECIFICATION forming part of Letters Patent No. 689,636, dated December 24, 1901.

Application filed September 30, 1901. Serial No. 77,124. (No model.)

*To all whom it may concern:*

Be it known that I, CHARLES W. CARRAWAY, a citizen of the United States, residing at Marco, in the county of Lee and State of Florida, have invented a new and useful Plow, of which the following is a specification.

My invention is an improved plow especially adapted for use in light sandy soil either for the purposes of a breaking-plow or of a cultivator; and it consists in the peculiar construction and combination of devices hereinafter fully set forth and claimed.

Figure 1:
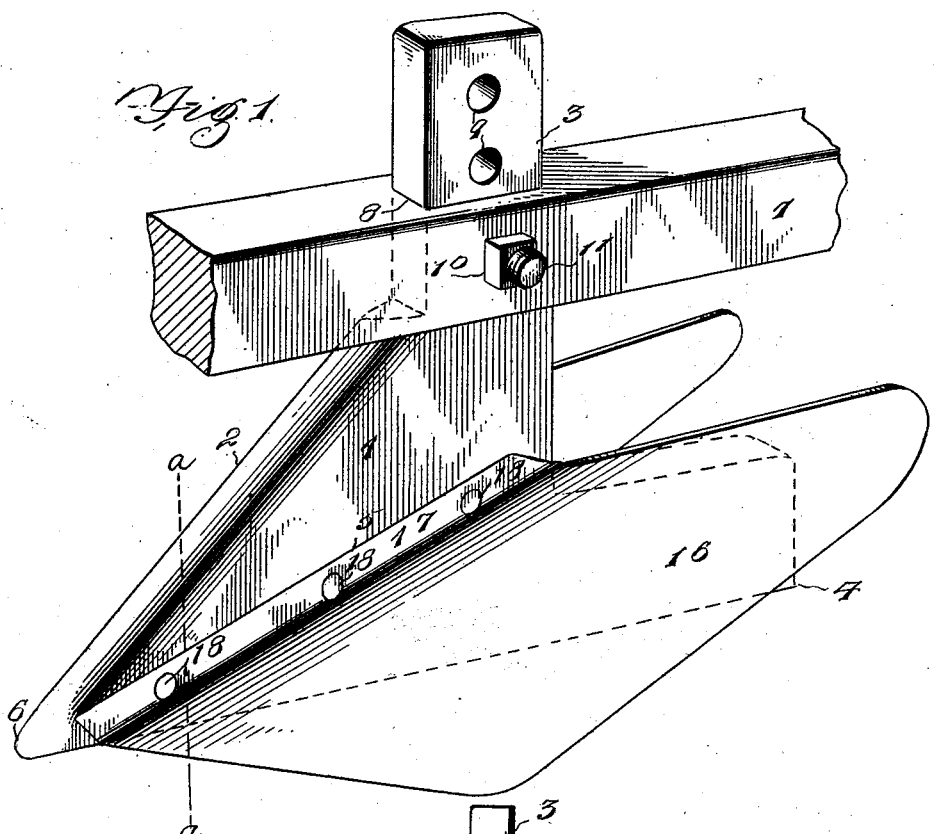
Figure 2:
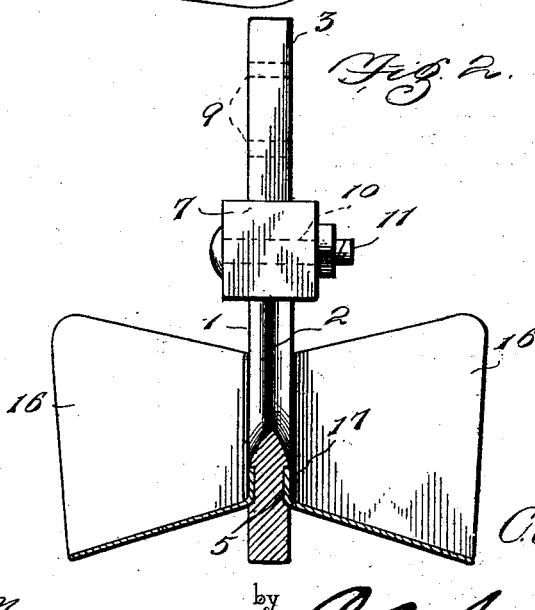

In the accompanying drawings, Figure 1 is a perspective view of a plow embodying my improvements. Fig. 2 is a front elevation of the same, partly in section, on a plane indicated by the line *a a* of Fig. 1.

The colter 1 has an inclined cutting edge 2 on its front side and is formed integrally with an upwardly-extending standard 3 and a rearwardly-extending foot 4, which operates in the bottom of the furrow. The colter is of comparatively slight thickness, and the opposite sides thereof are parallel with each other, and thereby the colter, which is very light, is adapted to be readily drawn through the soil. In opposite sides of the colter are inclined rabbets 5, which extend upward rearwardly and extend forwardly nearly to the point 6 of the colter.

The beam 7 of the plow may be of either wood or metal and is provided with a vertical opening 8, through which the standard 3 extends. Within the scope of my invention a keeper may be secured on one side of the beam to receive the standard in lieu of providing the beam with the opening 8, and I do not desire to limit myself in this particular. The said standard 3 is provided with a series of adjusting openings 9, and the beam has an opening 10. The standard is adjusted so that one of its openings 9 registers with the opening 10, and a bolt 11 is then passed through the said registering openings to secure the standard at any desired adjustment to the beam. Hence the latter may be raised or lowered with relation to the foot of the plow as may be desired and the plow adjusted to run as deeply in the soil as may be required.

In connection with my improved colter I provide wings 16, which form moldboards and of which one or two may be used with the colter, as may be desired. Each of the said wings is provided on its inner side with an upturned flange 17, which is adapted to fit in one of the rabbets 15, with which the colter is provided, and the said wings are secured to the said colter by suitable bolts 18, which pass through registering openings in said flanges of said wings and in said colter. A wing may be secured to either side of the colter according to the direction in which it is desired to turn the mold or throw the earth from the colter when the plow is used as a breaking-plow, and when the plow is used for cultivating a growing crop and is operated between the rows the colter should be equipped with a wing on each side, as shown in the drawings. The wings may be either of the form here shown or of any other preferred form, and in practice I provide each colter with a number of interchangeable wings of varying sizes and shapes to adapt the plow for a variety of uses.

A plow thus constructed is exceedingly cheap and simple, is strong and durable, and is exceedingly light and requires but little power to draw it through the soil.

If desired, the wings may be suitably braced on their under sides.

Having thus described my invention, I claim—

1. In a plow, a colter flat on opposite sides, having an inclined front cutting edge and formed integrally with an upwardly-extending standard and a rearwardly-extending foot, the said colter being adapted for the attachment of a turning-wing to either side thereof, substantially as described.

2. In a plow, a colter flat on opposite sides, having an inclined front cutting edge and formed integrally with an upwardly-extending standard and a rearwardly-extending foot, said standard having a series of adjusting openings and the said colter being adapted for the attachment of a wing to either side thereof, in combination with a beam having a guide-keeper to receive the said standard and provided with an opening to register with an adjusting opening of said standard, and a locking pin or bolt to enter said registering openings and thereby secure said standard at any desired adjustment to said beam, substantially as described.

3. In a plow, a colter of slight thickness, flat on opposite sides, having an upwardly-extending standard and a rearwardly-extending foot formed integrally therewith, said colter being further provided with an inclined front cutting edge and with an inclined rabbet on one or both sides, in combination with a wing having a flange at its inner side adapted to fit in the said rabbet, and means to secure said wing to said colter, substantially as described.

In testimony that I claim the foregoing as my own I have hereto affixed my signature in the presence of two witnesses.

CHARLES W. CARRAWAY.

Witnesses:
G. W. GANT,
R. L. EUBANK.